(12) United States Patent
Hocker et al.

(10) Patent No.: US 10,641,635 B2
(45) Date of Patent: May 5, 2020

(54) MEASURING ARRANGEMENT

(71) Applicant: Endress + Hauser Flowtec AG, Reinach (CH)

(72) Inventors: Rainer Hocker, Waldshut (DE); Oliver Popp, Oberwil (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 149 days.

(21) Appl. No.: 15/513,205

(22) PCT Filed: Sep. 2, 2015

(86) PCT No.: PCT/EP2015/070015
§ 371 (c)(1),
(2) Date: Mar. 22, 2017

(87) PCT Pub. No.: WO2016/045918
PCT Pub. Date: Mar. 31, 2016

(65) Prior Publication Data
US 2017/0307429 A1 Oct. 26, 2017

(30) Foreign Application Priority Data
Sep. 25, 2014 (DE) .......... 10 2014 113 898

(51) Int. Cl.
*G01F 15/08* (2006.01)
*G01F 15/00* (2006.01)
*G01F 1/74* (2006.01)

(52) U.S. Cl.
CPC ........... *G01F 15/08* (2013.01); *G01F 1/74* (2013.01); *G01F 15/00* (2013.01)

(58) Field of Classification Search
CPC ................. G01F 15/08; G01F 1/74
See application file for complete search history.

(56) References Cited

U.S. PATENT DOCUMENTS

| | | | |
|---|---|---|---|
| 2,869,366 A | 1/1959 | Nitikman | |
| 3,650,152 A | 3/1972 | White | |
| (Continued) | | | |

FOREIGN PATENT DOCUMENTS

| | | |
|---|---|---|
| CN | 2356321 Y | 12/1999 |
| CN | 10 1970991 A | 2/2011 |
| (Continued) | | |

OTHER PUBLICATIONS

Office Action dated Nov. 5, 2018, issued in corresponding Chinese application No. 2015-80051617.9.

(Continued)

*Primary Examiner* — Justin N Olamit
(74) *Attorney, Agent, or Firm* — Bacon&Thomas,PLLC

(57) ABSTRACT

A measuring arrangement for determining flow velocity of at least one liquid phase and/or a gas phase of a vapor or a fluid composed of a liquid and a gaseous phase or a supercritical fluid, comprising a measuring tube, on or in which at least one sensor element of at least a first flow measuring device is arranged for measuring the liquid phase or the gas phase, wherein the measuring tube has at least an inflow region and an outflow region, wherein between these two regions a central region is arranged, whose measuring tube cross section has a greater area than the area of the measuring tube cross section of the outflow region or of the inflow region, and method for ascertaining flow of phases of a vapor or of a fluid composed of a liquid and a gaseous phase, or a supercritical fluid.

7 Claims, 2 Drawing Sheets

A-A

(56) References Cited

U.S. PATENT DOCUMENTS

| | | |
|---|---|---|
| 4,305,548 A | 12/1981 | Miner et al. |
| 4,468,962 A | 9/1984 | Keech et al. |
| 4,674,337 A | 6/1987 | Jonas |
| 4,688,418 A | 8/1987 | Cheung et al. |
| 5,083,452 A | 1/1992 | Hope |
| 5,127,272 A | 7/1992 | Dean et al. |
| 5,390,547 A * | 2/1995 | Liu .................. G01F 1/74 73/200 |
| 5,679,905 A * | 10/1997 | Wardle ............ G01F 15/08 73/200 |
| 5,841,020 A | 11/1998 | Guelich |
| 6,338,276 B1 | 1/2002 | Durando et al. |
| 6,390,016 B1 | 5/2002 | Sanders |
| 6,912,918 B1 | 7/2005 | Lynnworth et al. |
| 2009/0229375 A1 | 9/2009 | Atkinson et al. |
| 2011/0252893 A1* | 10/2011 | Fjalestad .......... G01F 1/74 73/861.04 |
| 2014/0007696 A1 | 1/2014 | Al-Hadhrami et al. |

FOREIGN PATENT DOCUMENTS

| | | |
|---|---|---|
| CN | 101929884 B * | 5/2012 |
| CN | 101929884 B | 5/2012 |
| DE | 10 2014 113 898 A1 | 3/2016 |
| EP | 0 257 689 A2 | 3/1988 |
| FR | 2 610 105 A1 | 7/1988 |
| GB | 2 089 049 A | 6/1982 |
| JP | 2000320933 A | 11/2000 |
| WO | 03/062757 A1 | 7/2003 |
| WO | 2007/105961 A1 | 9/2007 |
| WO | 2009/003963 A2 | 1/2009 |
| WO | 2010/103003 A2 | 9/2010 |

OTHER PUBLICATIONS

German Search Report, German PTO, Munich, dated Jun. 3, 2015.
International Search Report, EPO, The Netherlands, dated Nov. 20, 2015.
Chinese Office Action dated May 14, 2019, issued in corresponding Chinese Application No. 201580051617.9.

* cited by examiner

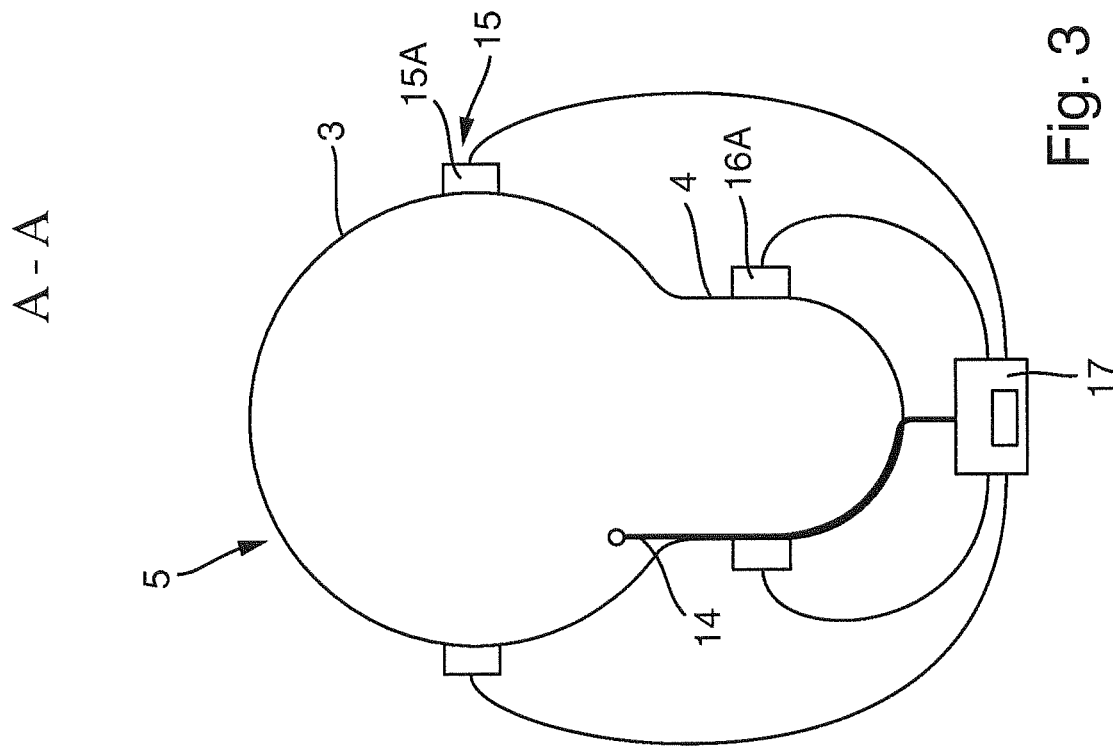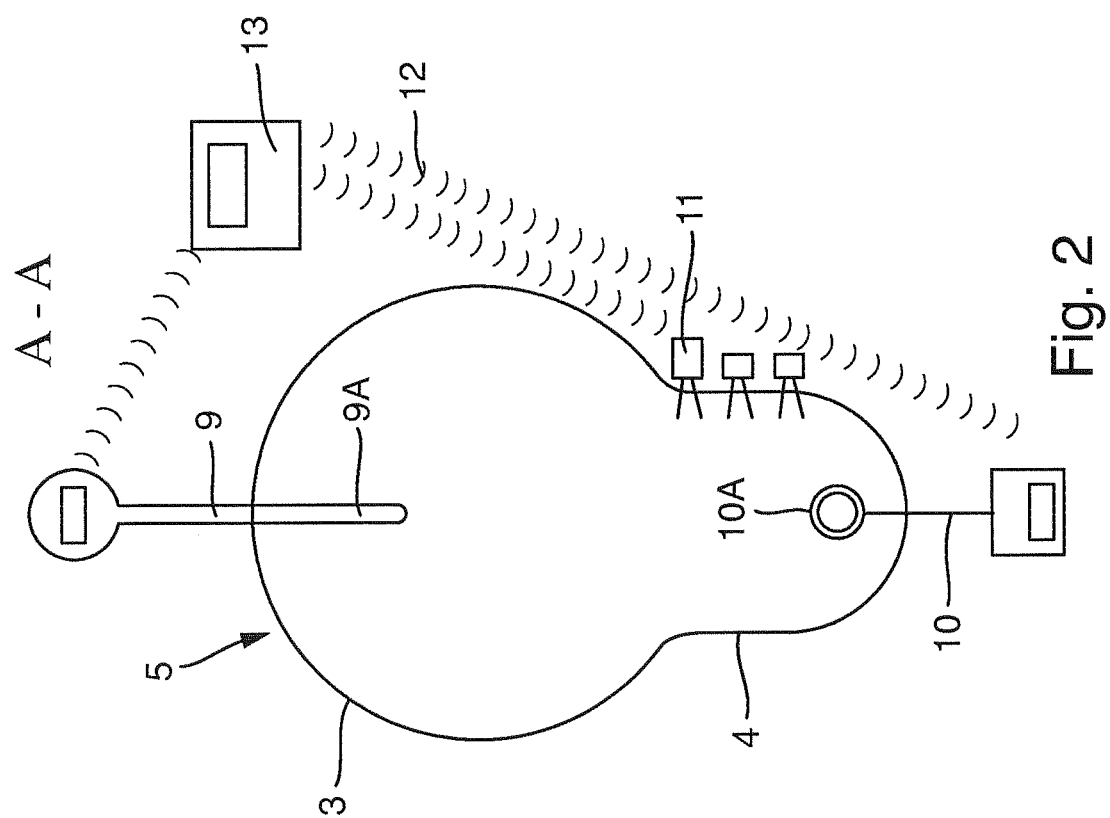

MEASURING ARRANGEMENT

TECHNICAL FIELD

The present invention relates to a measuring arrangement for determining the flow velocity of at least one phase of a vapor and to a method for ascertaining flow of phases of a vapor.

BACKGROUND DISCUSSION

In measuring flow velocity and flow rate of a vapor, for example, steam, so-called film flow can occur, in the case of which liquid deposits on the measuring tube wall and forms there a peripherally distributed, liquid film. This liquid film, respectively this wall flow, represents a disturbance of the flow measurement, respectively is not registered in the measurement.

SUMMARY OF THE INVENTION

An object of the present invention is to provide a measuring arrangement, which enables flow velocity measurement of at least one phase of a vapor with less disturbance.

According to the invention, a measuring arrangement for determining flow velocity of at least one liquid phase and/or a gas phase of a vapor is provided. The arrangement comprises a measuring tube, on or in which at least one sensor element of at least a first flow measuring device is arranged. This sensor element is part of a flow measuring device for measuring the liquid phase or the gas phase or a fluid composed of a liquid phase and a gaseous phase or a supercritical fluid.

Furthermore, according to the invention, the measuring tube has at least an inflow region and an outflow region, wherein between these two regions a central region is arranged, whose measuring tube cross section has a greater area than the area of the measuring tube cross section of the outflow region or of the inflow region.

The enlarged cross section slows the vapor, such that liquid components can be completely transferred into a channel on the floor of the measuring tube. Thus, the vapor can be separated into a liquid phase and a gas phase and the liquid transported in the lower region of the measuring tube. Each phase can be measured individually for its flow velocity. Disturbing, peripherally distributed, liquid films, as described above, do not occur in such case.

In a further development of the invention, the measuring tube of the measuring arrangement has in the installed state an orientation, in the case of which the inflow region and the outflow region are arranged essentially at the same height with respect to the force of gravity. Especially, a straight connecting line between the intersections of the measuring tube centerline with an end face of the measuring tube at the inflow region and with an end face of the measuring tube at the outflow region extends horizontally, respectively the connecting line deviates from the horizontal by no more than 20°, especially no more than 10°.

Advantageous embodiments of the invention are subject matter of the dependent claims.

It is advantageous, when, on the or in the measuring tube, supplementally to the sensor element mentioned in claim 1, at least one additional sensor element is arranged, which measures the flow velocity of the second phase.

In this way, the flow velocities of the phases of the vapor can be registered. In such case, the flow velocity of the liquid phase is often less than the flow velocity of the gas phase.

The sensor element can be part of the first flow measuring device. This is the case e.g. for an ultrasonic, flow measuring device having a number of ultrasonic transducer pairs. In this way, a compact construction can be implemented. It is, however, also possible to provide two or more, separate flow measuring devices in a measuring arrangement. In both cases, the measuring arrangement enables measuring the flow velocities of both the liquid phase or liquid phases as well as also the gas phase.

It is additionally possible to implement a flow rate measurement. For this, one can supplement the measuring arrangement with a fill level sensor or a limit level sensor, which enables a determining of the fill level or an indication of an achieved limit level of the liquid phase in the measuring tube. Therewith, the volumes of the liquid fraction and the gas fraction are ascertainable and, in the case of known densities, their mass fractions.

For a favorable positioning of sensor elements, it is advantageous to provide the central region of the measuring tube with a channel for collecting the liquid phase. This provision means that also small liquid amounts can be measured sufficiently exactly.

The central region of the measuring tube includes a gasline segment. This also enables favorable positioning of sensor elements.

The measuring tube can be integrated directly into an existing plant. For this, the measuring tube is connectable at each end terminally into a process line, preferably by means of flange connections.

As a whole, the measuring arrangement can especially advantageously be implemented in compact construction, wherein it has at least one sensor element, which is arranged in an upper region of the measuring tube for determining the flow velocity of the gas and at least one sensor element, which is arranged in a lower region of the measuring tube for determining the flow velocity of the liquid, and at least one sensor element for determining the fill level of the at least one liquid in the measuring tube and an evaluation unit, which ascertains the flow of the at least two phases and which is connected with the sensor elements. The connection can occur by cable or also by radio connection. In such case, each sensor element does not require its own evaluation unit but, instead, all sensor signals can be handled by a single evaluation unit.

Furthermore, a method of the invention for ascertaining flow of phases of a vapor comprises method steps as follows:
a) introducing a vapor into the measuring tube of a measuring arrangement, which has at least an inflow region and a central region, wherein the inflow region has a cross section of smaller area than the central region, and wherein the vapor separates in the measuring tube into at least one liquid phase and a gas phase,
b) ascertaining flow velocities of the phases,
c) ascertaining fill level of the liquid phase or the liquid phases in the measuring tube, and
d) calculating flow rates of the phases taking into consideration the ascertained flow velocities and fill level.

In this way, a flow measurement of the individual components of the vapor is enabled.

BRIEF DESCRIPTION OF THE DRAWINGS

The subject matter of the invention will now be explained in greater detail based on a number of examples of embodiments and with the aid of the drawing, the figures of which show as follows:

FIG. 2 is a sectional, schematic view of a first variant of an apparatus of the invention; and FIG. 3 is a sectional, schematic view of a second variant of an apparatus of the invention.

DETAILED DISCUSSION IN CONJUNCTION WITH THE DRAWINGS

Figure 1:
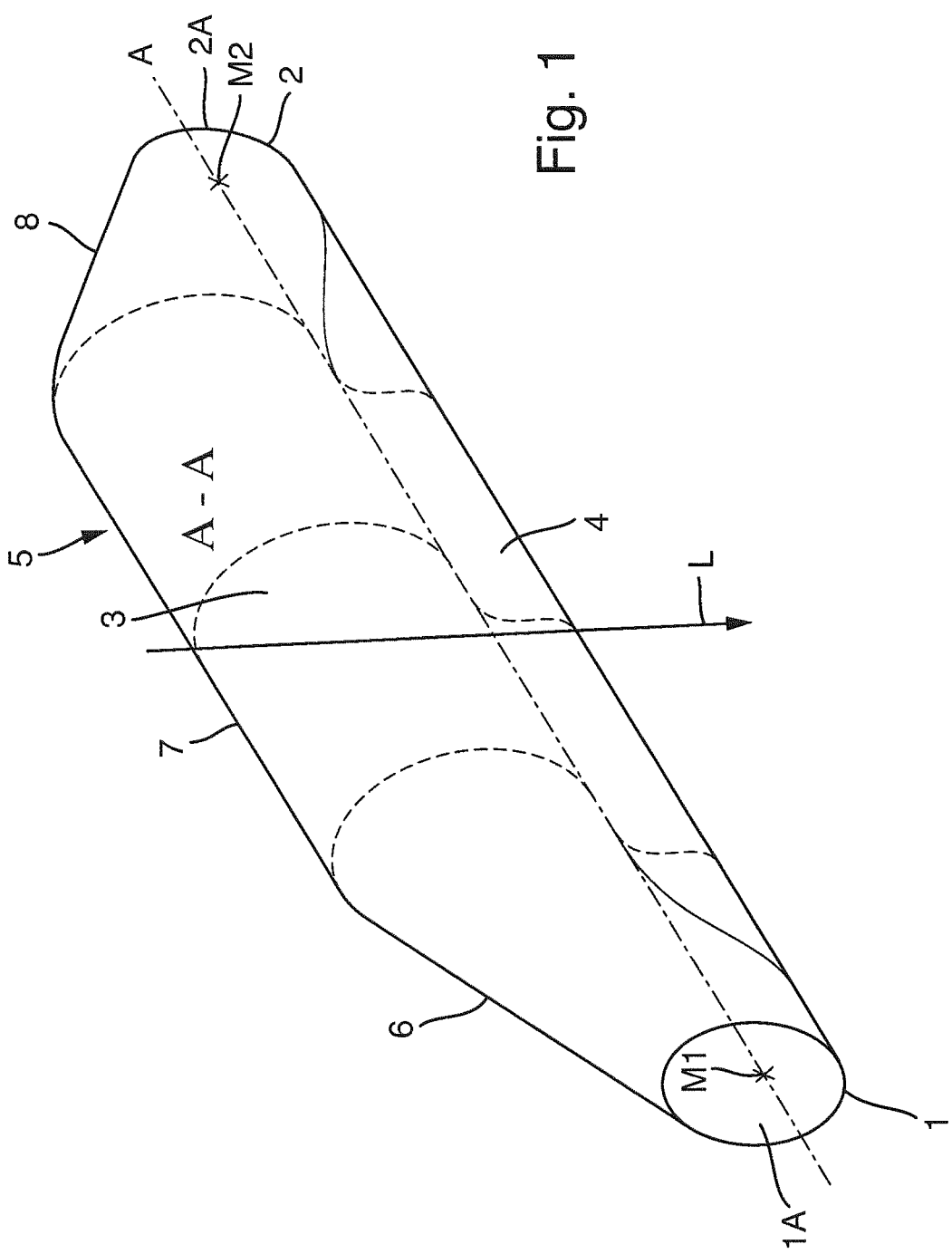
FIG. 1 is a perspective view of a measuring tube of an apparatus of the invention for determining flow velocity and/or flow rate of a vapor.

The present invention relates mainly to the measuring of the phases of vapor flows. In such case, the vapor can be e.g. steam. However, the vapor can also be other condensing gases, such as hydrocarbon compounds. In such case, it can especially encompass gases, which are intended to liquify or condense. A typical application of such fluids is in a refrigerator. Furthermore, the invention can also be applied in the case of non-condensing gases, in which a second, liquid phase is present.

Such vapors have a Froude number of less than 1 and a Lockhart-Martinelli parameter of less than 0.3. Any flow above these parameters would be a liquid with air bubbles.

In vapor carrying lines, it is very helpful to the user to know the vapor quality. This is calculated by dividing the mass that is vapor by the total mass. The information for this calculation can be obtained with the help of a diffuser, which slows the flow by increasing the measuring tube cross section perpendicular to the measuring tube axis.

This diffuser serves at the same time as the measuring tube and includes sensor elements of a measuring arrangement, which determines the flow velocity and/or the flow rate of the phases.

The nominal diameter enlargement within the measuring tube 5 forms, independently of the operating state in the adjoining process line, a channel flow of a liquid phase. This permits separate measurement of the total mass flow and the vapor mass flow, so that then the steam quality can be calculated.

FIG. 1 shows schematically a measuring tube 5 for separating a vapor mixture into a gas phase $\varphi_1$ and a liquid phase $\varphi_2$. Measuring tube 5 includes an inflow region 1, with an intake opening 1A. Furthermore, the measuring tube includes an outflow region 2, with a drain opening 2A. Intake opening 1A and drain opening 2A have, respectively, a midpoint M1 and M2. The line between these midpoints M1 and M2 is the measuring tube axis A.

The cross sectional shape of the inlet openings 1A and 2A is either circular or oval. Over the course of the measuring tube axis A between the midpoints M1 and M2, the cross sectional shape changes. This involves a broadening of the cross section. Thus, the cross sectional area increases.

The cross sectional shape of the measuring tube 5 changes in such a manner that there is arranged, with respect to the vertical direction L, in a lower region of the measuring tube 5 a channel 4, in which the liquid phase collects. A gasline segment 3 is located, with respect to the vertical direction L, in an upper region of the measuring tube 5. The gasline segment 3 has, in such case, a significantly greater cross sectional area than the channel 4.

Measuring tube 5 shown in FIG. 1 is composed of an inflow region 1, a first transition region 6, a central region 7, second transition region 8 and an outflow region 2, as will be explained in greater detail below.

The inflow region 1 has a measuring tube cross section, which is circular or oval. Especially already in the inflow region 1, the shape of the measuring tube cross section can, in given cases, abruptly change. At the front of the intake opening 1A, there can be arranged for the inflow region 1 a corresponding tube section, which has a flange for connection to a process pipe. In analogous manner, also an outflow region 2 can have such a tube section.

Within the first and second transition regions 6 and 8, the measuring tube cross section changes its shape and its area, wherein the area continuously increases, respectively decreases, to and from the central region 7.

In the central region 7, the measuring tube 5 has over this entire region a uniform measuring tube cross section with the mentioned channel 4 and the gasline segment 3.

In FIG. 1, the gasline segment 3 has a tubular arc shaped outer contour and the channel 4 a u-shaped outer contour. The two outer contours merge, in such case, into one another.

The shape of measuring tube 5 shown in FIG. 1 is, however, only one preferred form of a number of possible embodiments. Thus, another option is, for example, that the middle segment 7 is triangularly embodied, wherein a triangle vertex forms the channel 2.

By expanding the area of the measuring tube cross section along the measuring tube axis A, a demixing of the vapor phase into a gas phase and a liquid phase is achieved.

The benefit of channel 4 is a liquid fill level sufficient for making a flow measurement, Flow measurement of the gas phase and the liquid phase can be implemented using flow measuring techniques known per se. Appropriate flow measuring techniques for gases include, for example, ultrasonic, flow measurement, thermal, flow measurement, vortex, flow measurement, pressure difference, flow measurement or flow measurement based on a so-called "V-cone".

The flow rate of the liquid phase can be measured, for example, by means of magneto-inductive flow measurement, ultrasound measuring technology or pressure difference measurement.

Two combination embodiments are shown in FIGS. 2 and 3.

FIG. 2 is a schematic representation of a section of the middle segment 7 of the measuring tube 5. It shows an arrangement of a thermal, flow measuring device 9 and a pressure difference, flow measuring device 10, respectively an arrangement of the sensor elements 9A and 10A of these flow measuring devices, on the measuring tube 5. In such case, the pressure difference, flow measuring device 10 measures the flow velocity of the liquid phase $\varphi_2$ and the thermal, flow measuring device 9 measures the flow velocity of the gas phase $\varphi_1$.

In order, supplementally, to determine a flow rate, the volume of the liquid in the channel 4 must be ascertained. This can occur, for example, via limit level sensors, e.g. vibratory limit switch 11, or alternatively via light barriers.

Alternatively, also a fill level measurement can occur. For this, there can be arranged in the upper region of the measuring tube 5 an ultrasonic sensor, which ascertains the fill level by registering travel time. Another opportunity for fill level measurement is offered by radar measurement. Moreover, also other fill level measuring methods are known.

The measured values ascertained by the thermal, flow measuring device 9, the pressure difference, flow measuring device 10 and the limit level sensors 11 can be transmitted to an evaluation unit 13. This occurs in FIG. 1 by a wireless radio connection 12.

FIG. 3 shows another embodiment for separately measuring the gas phase $\varphi_1$ and the liquid phase $\varphi_2$ in the measuring tube 5. Both phases are, in such case, measured by ultrasonic, flow measurement. Determination of the volume of the liquid can occur using a capacitive fill level measuring device. Thus, a capacitive measuring transducer 14 is connected in FIG. 3 with a measurement transmitter 17. Ultrasonic sensor elements 15A and 16A of an ultrasonic, flow measuring device 15 are arranged on the measuring tube 5 and likewise connected with the measurement transmitter. The measurement transmitter includes an evaluation unit, which evaluates the measured values and outputs values for the flow velocities of the phases and/or flow rate values of the phases.

Especially capacitive, fill level measurement and ultrasonic, fill level measurement are advantageous in the case of measuring a three-phase mixture, wherein upon phase separation there is a gas phase and two non- or only limitedly mixable liquids. The capacitive, fill level measurement enables here the measuring of the fill level heights of the two liquids and permits therewith a statement relative to the flow rates of each of the liquid phases.

In an especially preferred embodiment, the measuring apparatus can be supplemented with one or more temperature sensors for ascertaining the temperature of the liquid phase and/or the gas phase.

The empty tube velocities of the two phases are so matched by the geometric ratios that a channel flow safely arises for the liquid phase.

The invention claimed is:

1. A measuring arrangement for determining a flow velocity of at least one liquid phase and/or a gas phase of a vapor or a fluid composed of a liquid phase and a gaseous phase, or a supercritical fluid, comprising:
    a measuring tube;
    at least one sensor element for determining a flow velocity of the liquid phase and at least one sensor element for determining a flow velocity of the gas phase, wherein:
    said measuring tube has at least an inflow region, an outflow region, and a central region between said inflow region and said outflow region,
    the measuring tube comprises a measuring tube cross section for each region,
    the measuring tube cross section of said central region has a greater area than the area of the measuring tube cross section of said outflow region or of said inflow region, and
    the measuring tube has a first transition region and a second transition region, within the first transition region, the area of the measuring tube cross section continuously increases to the central region, and within the second transition region, the area of the measuring tube cross section decreases from the central region,
    wherein said at least one sensor element for determining a flow velocity of the liquid phase and said at least one sensor element for determining the gas phase are arranged in the central region,
    wherein said central region of said measuring tube has a channel for collecting the liquid phase,
    wherein said central region of said measuring tube has a gasline segment,
    wherein said gasline segment has a greater cross sectional area than said channel,
    wherein said at least one sensor element for determining the flow velocity of the gas is arranged in the gasline segment of said measuring tube, and
    wherein said at least one sensor element for determining the flow velocity of the liquid phase is arranged in the channel of said measuring tube.

2. The measuring arrangement as claimed in claim 1, wherein:
    the measuring arrangement has a fill level sensor or a limit level sensor for determining the fill level or for displaying an achieved limit level of the liquid phase in said measuring tube.

3. The measuring arrangement as claimed in claim 1, wherein:
    said measuring tube is connectable at each end terminally into a process line.

4. The measuring arrangement as claimed in claim 1, wherein:
    the measuring tube has in an installed state an orientation, in the case of which said inflow region and said outflow region are arranged essentially at a same height with respect to a force of gravity.

5. The measuring arrangement as claimed in claim 1, wherein:
    a straight connecting line between intersections of the measuring tube centerline with an end face of said measuring tube at said inflow region and an end face of said measuring tube at said outflow region extends horizontally, respectively deviates from the horizontal by no more than 20°.

6. The measuring arrangement as claimed in claim 1, wherein:
    said measuring tube is connectable at each end terminally into a process line by means of a flange connection.

7. The measuring arrangement as claimed in claim 1, wherein:
    a straight connecting line between intersections of the measuring tube centerline with an end face of said measuring tube at said inflow region and an end face of said measuring tube at said outflow region extends horizontally, respectively deviates from the horizontal by no more than 10°.

* * * * *